(12) United States Patent
Perkins et al.

(10) Patent No.: US 10,412,906 B2
(45) Date of Patent: Sep. 17, 2019

(54) SAP-COLLECTING DEVICES, SYSTEMS AND METHODS FOR SAP-PRODUCING SAPLINGS

(71) Applicant: University of Vermont and State Agricultural College, Burlington, VT (US)

(72) Inventors: Timothy D. Perkins, Richmond, VT (US); Abby K. van den Berg, South Burlington, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 631 days.

(21) Appl. No.: 14/381,884

(22) PCT Filed: Mar. 1, 2013

(86) PCT No.: PCT/US2013/028500
§ 371 (c)(1),
(2) Date: Aug. 28, 2014

(87) PCT Pub. No.: WO2013/130925
PCT Pub. Date: Sep. 6, 2013

(65) Prior Publication Data
US 2015/0040472 A1 Feb. 12, 2015

Related U.S. Application Data

(60) Provisional application No. 61/605,472, filed on Mar. 1, 2012.

(51) Int. Cl.
A01G 23/10 (2006.01)
A01G 23/14 (2006.01)

(52) U.S. Cl.
CPC ............. *A01G 23/10* (2013.01); *A01G 23/14* (2013.01)

(58) Field of Classification Search
CPC ......... A01G 23/10; A01G 23/14; A01G 23/12
(Continued)

(56) References Cited

U.S. PATENT DOCUMENTS 6,370,818 B1   4/2002   Chabot et al.
6,988,332 B2   1/2006   Harvey
(Continued)

FOREIGN PATENT DOCUMENTS

CA       2271262       11/2000

*Primary Examiner* — Kristen C Hayes
(74) *Attorney, Agent, or Firm* — Hodgson Russ LLP

(57) ABSTRACT

Sap-collecting devices, systems and methods for sap-producing saplings are disclosed. The saplings each have at least one stem, which is cut to form a top end at a reasonable height above ground. The sap-collecting system includes a sap-collecting device that fits over the top end and forms a vacuum-tight seal with the stem. The sap-collecting device includes an interior and an access port open to the interior. The access port can be connected to a line system. A vacuum system is operably connected to the line system and forms a vacuum within the sap-collecting device. This serves to draw the sap from the top end of the sapling, through the sap-collecting device, through the line system and to a collecting tank. A plantation growth, management, and sap-collecting system that comprises the sap-collecting system and a stand of saplings is also disclosed.

11 Claims, 10 Drawing Sheets

(58) Field of Classification Search
USPC .......................................................... 47/50–54
See application file for complete search history.

(56) References Cited

U.S. PATENT DOCUMENTS

| | | |
|---|---|---|
| 2010/0170152 A1 | 7/2010 | Perkins |
| 2011/0173880 A1 | 7/2011 | Perkins |
| 2011/0173881 A1* | 7/2011 | Perkins .................. A01G 23/14 |
| | | 47/52 |
| 2011/0220564 A1 | 9/2011 | Cote |

* cited by examiner

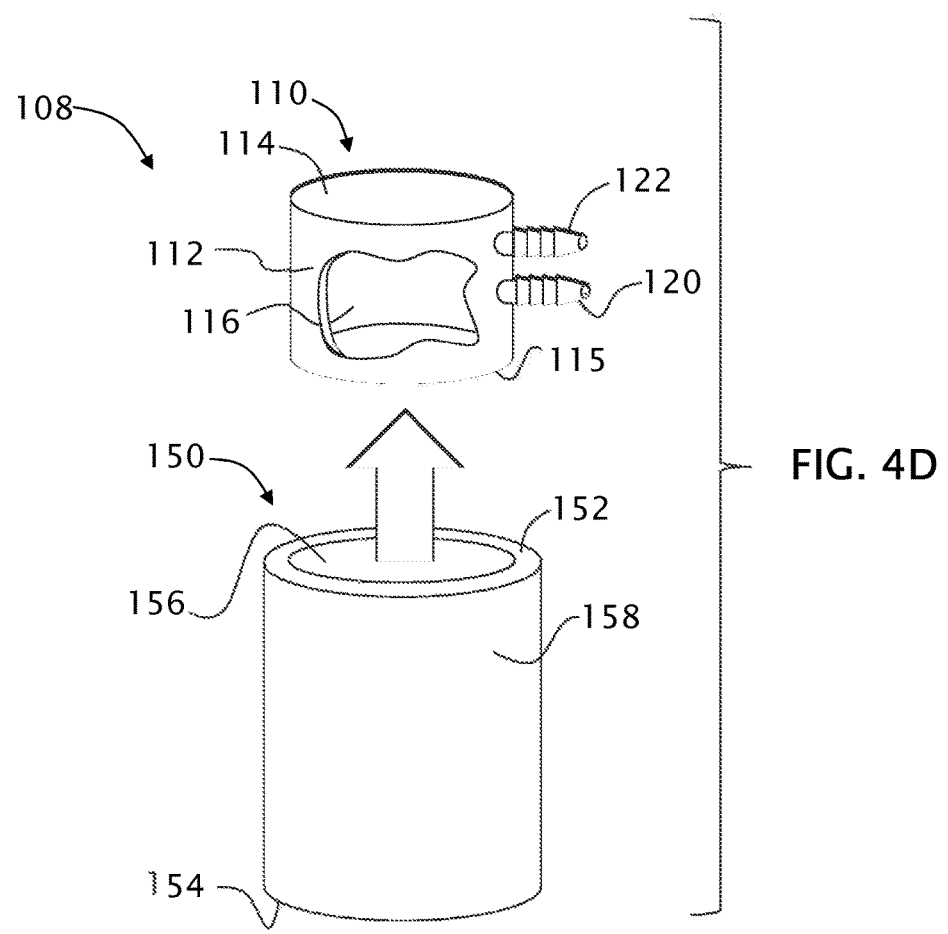

SAP-COLLECTING DEVICES, SYSTEMS AND METHODS FOR SAP-PRODUCING SAPLINGS

CROSS-REFERENCE TO RELATED APPLICATIONS

The present application claims the benefit of U.S. Provisional Patent Application No. 61/605,472, filed on Mar. 1, 2012, and titled "Sap-Collecting Devices, Systems And Methods For Sap-Producing Saplings," which application is incorporated herein by reference in its entirety.

FIELD

The present disclosure relates generally to sap collecting, and in particular relates to sap-collecting devices, systems and methods for sap-producing saplings.

BACKGROUND ART

In the existing systems of sap collecting for syrup production, large mature maple trees (e.g., typically having a diameter at breast height (dbh) of at least 8 inches) in naturally-regenerated hardwood stands are tapped in the spring using a drill bit and a spout inserted therein to channel the sap into a collecting system. In some older systems, the sap is collected from each tree with buckets, while in more modern systems sap is collected via a network of plastic tubing that connects each tree to one or more central collecting points. In the latter system, the flow of sap can be augmented by applying a vacuum to the spout via the tubing system.

Conventional sap collecting approaches typically require some level of crop management. This can range from minimal thinning to individual crop tree selection and tending on a periodic basis to encourage strong crown growth of dominant and co-dominant trees. The density of a typical managed stand of maple trees can range from about 40 to 120 trees/acre, with 80 maple crop trees/acre or greater being considered wellstocked.

Conventional sap-collecting systems place severe constraints on the potential productivity of maple syrup production operations. The large land area required for the tree stand results in relatively low productivity per unit land area, usually in the range from about 16 to about 40 gallons of syrup per acre annually. In addition, the need for a stand of mature trees with adequate spacing and other properties conducive to sap production limits the growth and expansion of the sap collecting operation due to the large land area lengthy time span required to establish the stand.

One way to increase the total sap (and thus syrup, sugar, or other desirable plant compound) output of existing sap collecting operations is to try to add new trees or by initiating new production operations. However, this requires a substantial investment to purchase or lease large tracts of forested land. And, there is a finite quantity of existing land that meets the appropriate criteria for syrup production, and maple syrup production in particular. Moreover, it typically requires at least 30 to 50 years for a maple tree to become mature enough before it can be tapped using conventional sap collecting techniques.

Moreover, current sap-collecting systems involve high operating costs to support and maintain a sap collecting infrastructure over a large forested area. The tubing collecting system not only requires large initial investments in supplies and labor for its creation and installation, but also poses high annual recurring costs for maintenance.

SUMMARY

An aspect of the disclosure is a method of collecting sap from a sapling having at least one stem. The method includes cutting the at least one stem to form a top end. The method also includes placing a sap-collecting device over the top end of the at least one stem, with the sap-collecting device having an interior and a first access port, and with the sap-collecting device forming a vacuum-tight seal with the at least one stem. The method further includes applying a partial vacuum to the first access port of the sap-collecting device to draw sap from the top end of the stem and out of the first access port.

Another aspect of the disclosure is a sap-collecting system for collecting sap from a plurality of sap-producing saplings having respective stems each having a cut top end. The system has a plurality of sap-collecting devices operably disposed one each over respective top ends of the stems to form a vacuum-tight seal, with each sap-collecting device having an interior and a first access port. The system also has a line system operably connected to the first access ports. The system further includes a vacuum system operably connected to the line system. The vacuum system has a collecting tank. The vacuum system is configured to apply a partial vacuum to each of the interiors of the sap-collecting devices so that sap flows from the top ends of the stems, through the corresponding sap-collecting devices and through the line system to the collecting tank.

Another aspect of the disclosure is a plantation system for collecting sap that includes the above-described sap-collecting system and the plurality sap-producing saplings to which the sap-collecting system is operably connected.

Additional features and advantages of the disclosure are set forth in the detailed description that follows, and in part will be readily apparent to those skilled in the art from that description or recognized by practicing the disclosure as described herein, including the detailed description that follows, the claims, as well as the appended drawings.

It is to be understood that both the foregoing general description and the following detailed description present embodiments of the disclosure are intended to provide an overview or framework for understanding the nature and character of the disclosure as it is claimed.

The claims are incorporated into and constitute part of the Detailed Description set forth below.

BRIEF DESCRIPTION OF THE DRAWINGS

FIG. 4C, FIG. 4D, and FIG. 4E are isometric views of an example sap-collecting device showing example end caps along with an example sealing member.

The drawings are included to provide a further understanding of the disclosure, and are incorporated into and constitute a part of this specification. The drawings illustrate various embodiments of the disclosure, and together with the description serve to explain the principles and operations of the disclosure.

DETAILED DESCRIPTION

Figure 1:
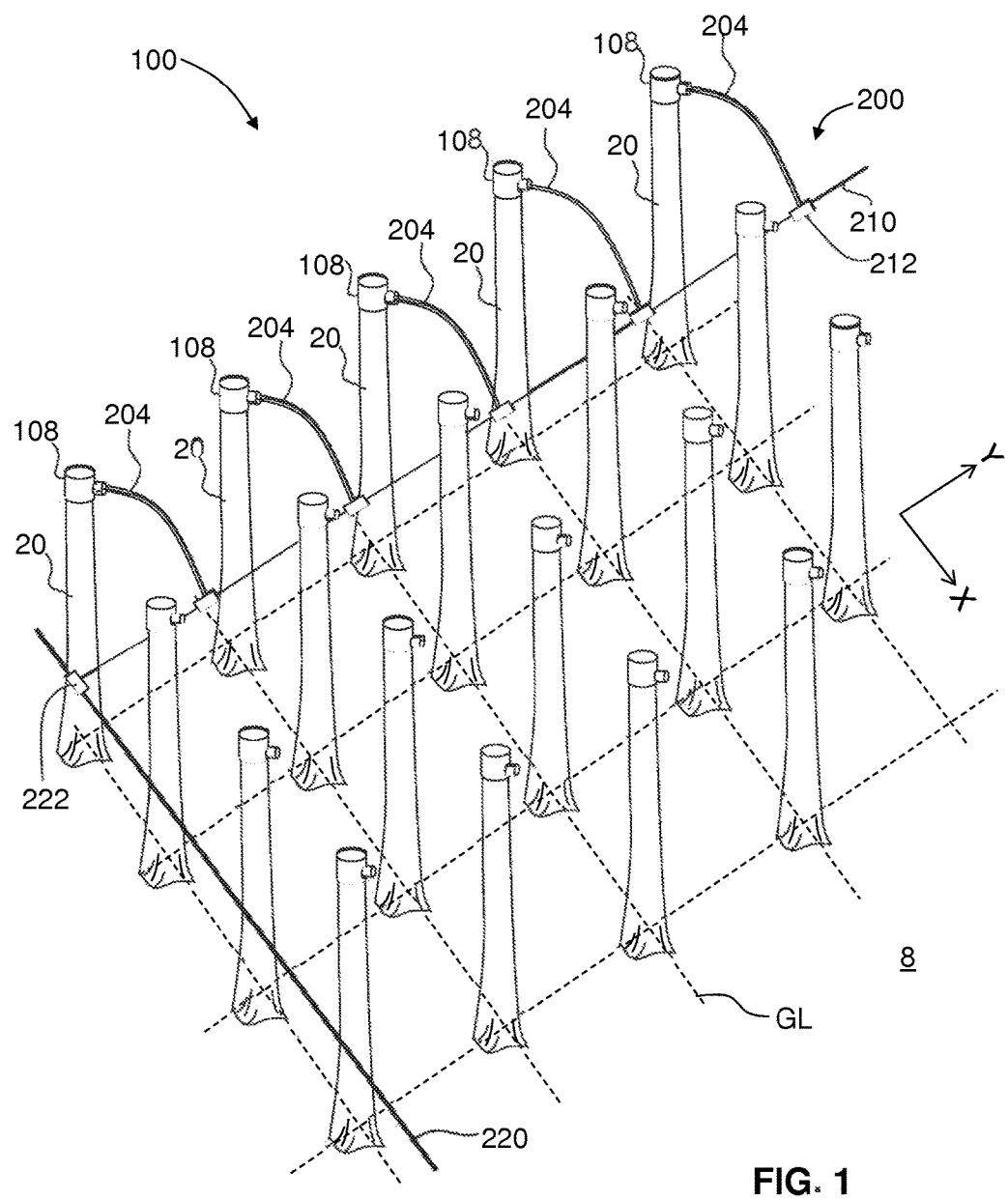
FIG. 1 is a schematic elevated view of a portion of an example plantation sap-collecting system that employs the sap-collecting devices and sap-collecting system of the disclosure.

FIG. 1 is an elevated view of an example of a portion of a plantation sap-collecting system ("system 100") according to the disclosure. System 100 includes a stand 10 of sap-producing tree saplings ("saplings") 20 in ground (soil) 8 that contains water 9. System 100 also includes sap-collecting devices 108 and a line system 200, a portion of which is shown in FIG. 1. A more complete example of system 100 is described in detail below in connection with FIG. 5.

Figure 2:
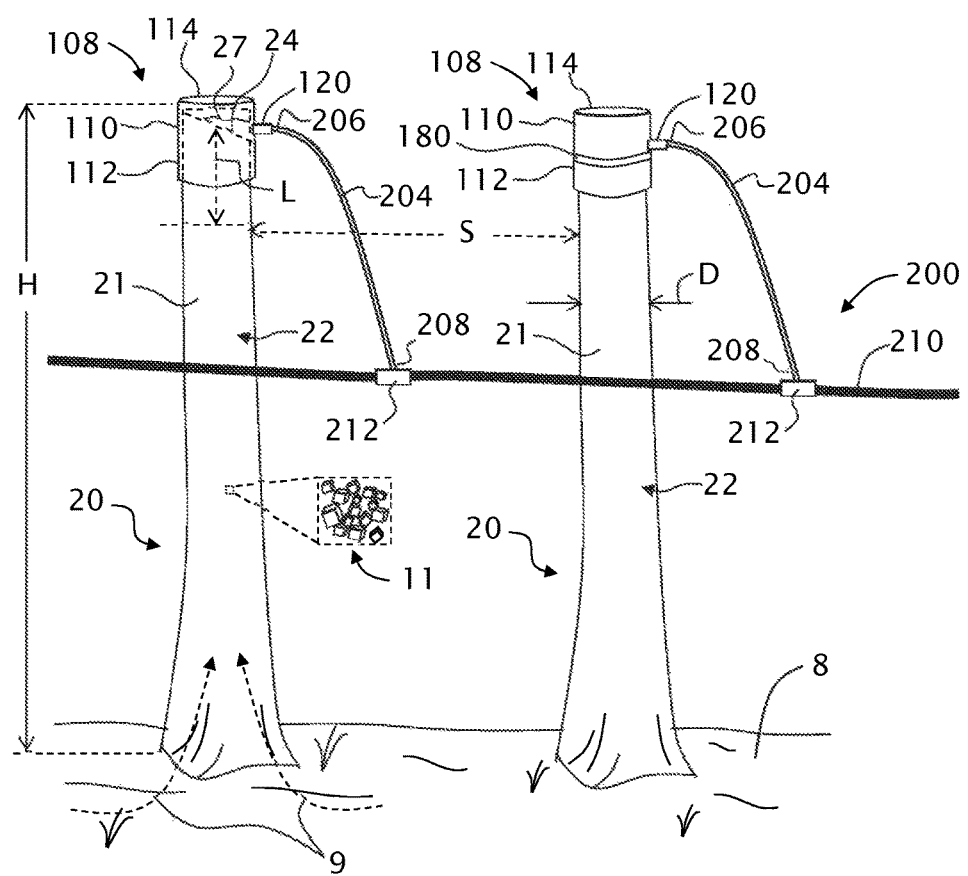
FIG. 2 is a close-up view of two example saplings in the plantation sap-collecting system of FIG. 1.

FIG. 2 is a close-up view of two example saplings 20 of system 100. In an example, saplings 20 are reared from seed planted in ground 8, while in another example are derived from natural or reared transplanted seedlings, while in yet another example, are formed by thinning a natural stand of saplings. In an example, adjacent saplings 20 in stand 10 are to allow access to each sapling by a person. An example nominal spacing S between adjacent saplings 20 is in the range from about 2 feet to about 10 feet. In a more specific example, saplings 20 are planted and grown on a fairly tight grid, as indicated in phantom by grid lines GL in FIG. 1. Example grid spacings S are 2'×2', 3'×3', 4'×2', etc. Other example spacings can be selected to allow room for equipment (tractors, cultivators) to move between rows of saplings.

An example density of saplings 20 in a stand 10 for system 100 is in the range from about 5,000 to about 10,000 saplings/acre. In a more general example, the density of saplings 20 is at least 5 times greater than the typical maximum density of a stand of mature sap producing trees of about 120 trees per acre.

The term sapling as used herein generally means a small woody plant or shrub or other form of vegetation. In an example, sapling 20 comprises an immature, slender tree. Each sapling 20 has at least one stem 21 that contains sugar 11 (see FIG. 2) or other plant compounds desirable of being collected. Thus, in the discussion below, for a sapling comprising a single stem, the terms "sapling" and "stem" are synonymous, and in the discussion below these terms are used interchangeably where appropriate.

The term sap as used herein generally means a liquid substance containing sugar or other plant compounds to be collected.

Example sap-producing saplings (referred to herein as just "saplings" for short) include maple, birch, walnut, butternut, rubber, palm and grapevine. Stand 10 can include a single type of sapling or different types of saplings. Thus, while it is anticipated that the systems and methods described herein will find much use in connection with harvesting maple sap from maple saplings, the systems and methods are not so limited and apply generally to any sap-producing sapling.

Stem 21 includes an outer surface 22 and a top end 24 formed by cutting the stem at a convenient height H. In an example, top end 24 is cut flat and further in an example is cut at an angle θ relative to a horizontal plane HP (see FIG. 4B, introduced and discussed below). An example angle θ can range from 10 degrees to 45 degrees. An example nominal height H for saplings 20 (as measured from ground 8) is one that is generally readily accessible by a person, perhaps with a short ladder. While height H could in principle be quite large, in one example height H is in the range from 0.25 feet to 10 feet, with a practical and specific example having the height H in the range from 1 foot to 10 feet, with 6 feet being an exemplary height. An example diameter D for a stem 21 is in the range from about 2.0 cm to about 10 cm dbh, with 5.0 cm to 7.5 cm being an exemplary range within the larger range for diameter D.

An example age of sapling 20 prior to cutting stem 21 to form top end 24 is between about 3 and 15 years. The age of the saplings in a plantation system prior to initiating sap harvest would be dependent upon the species and genetics of the plants used, the environmental conditions, and the cultivation practices (irrigation, fertilization) employed. Note that in contrast a typical maple tree can take between 30 and 100 years to grow before being suitable for use in conventional maple syrup production. In an example, for existing saplings 20 cut to form top end 24 in subsequent seasons, a length L of about 6" to 12" of stem 21 is cut off from the top end for the subsequent sap-collecting season. The removed portion of stem 21 can be ground into wood chips and used either as ground mulch or as a fuel for evaporator 310 (discussed below), which is used to concentrate the sap. Irrigation, fertilization, and weed/insect/disease control can also be applied to saplings 20 either by being broadcast in the plantation on the ground, through a separate tubing system. Stems can be cut each year, or may be allowed to recover for one or more seasons before being recut for sap collection again.

Figure 3:
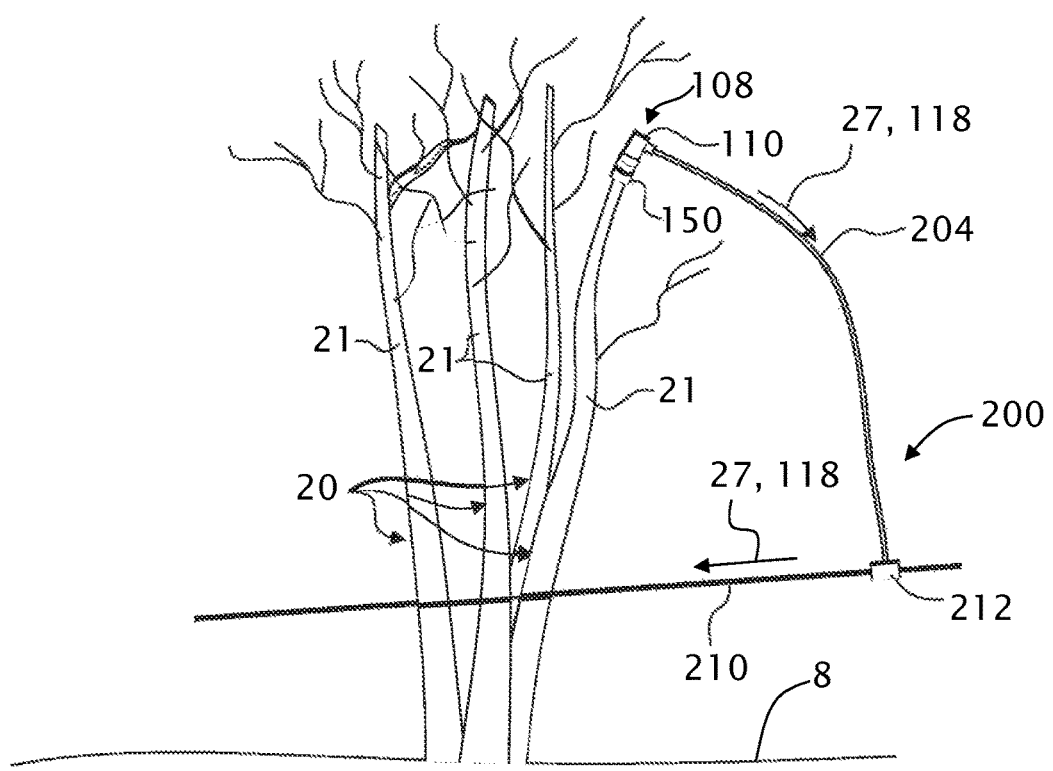
FIG. 3 is a side view of an example sapling that has multiple stems, with one of the stems having been cut and sap-collecting device operably arranged thereon.

The growth of saplings 20 can be encouraged by cutting or genetic selection so that they grow in a multi-stemmed manner, such as shown in FIG. 3. A different stem 21 can be cut each spring to generate good sap flow and to encourage the development and growth of new stems while maintaining a small stature of the overall plant. This approach is advantageous in that it can leave the majority of the sapling's foliage intact from year to year, thereby allowing for faster recovery of lost above-ground biomass (foliage) of the cut sapling. In an example, saplings 20 with only a few dominant stems 21 can be cut successively lower each spring to allow sap flow to occur for many seasons. The systems and methods disclosed herein are discussed and shown mainly in connection with single-stem saplings 20 rather than multi-stemmed saplings for ease of description and illustration. In some examples, more than one stem on a multi-stemmed sapling might be cut and sap harvested each year.

Figure 4A:
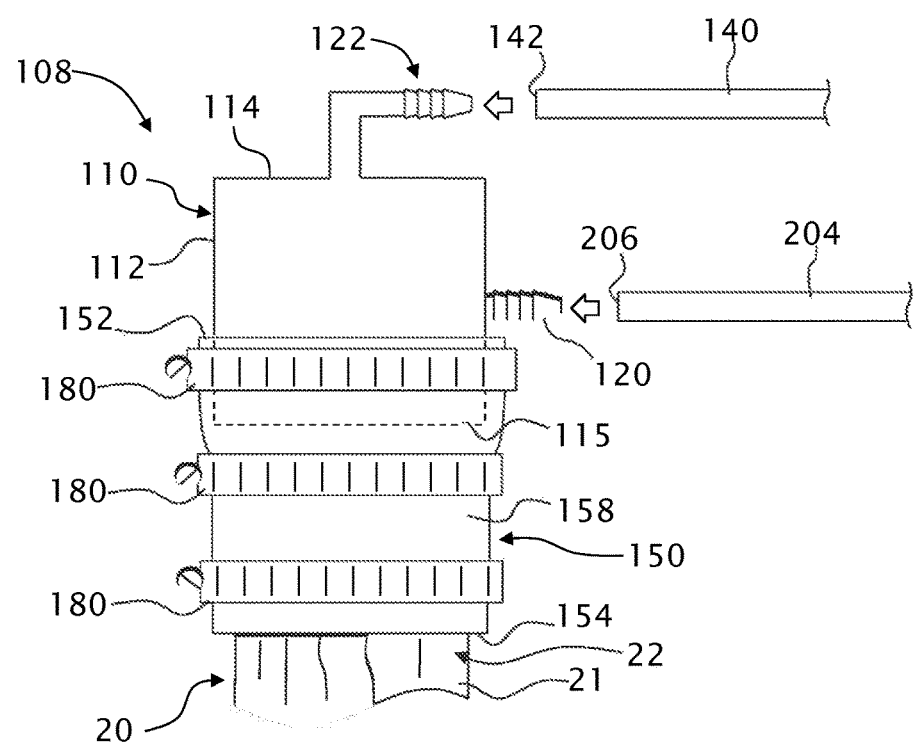
FIG. 4A is a close-up view of a single-stem sapling that shows an example sap-collecting device operably arranged at the top end of the cut stem.
Figure 4B:
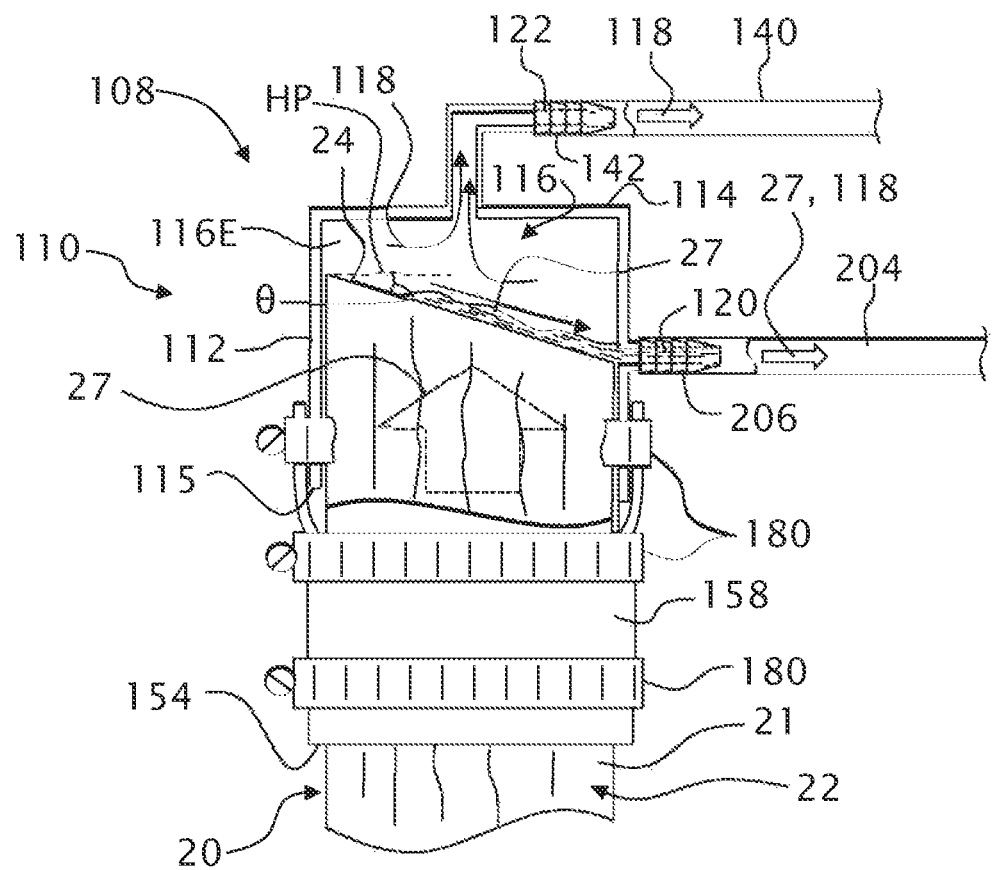
FIG. 4B is similar to FIG. 4A and is a partial cut-away view of the sap-collecting device of FIG. 4A, showing the angled cut top end and the flow of sap from the stem, through the sap collecting device and out the access port.
Figure 4C:
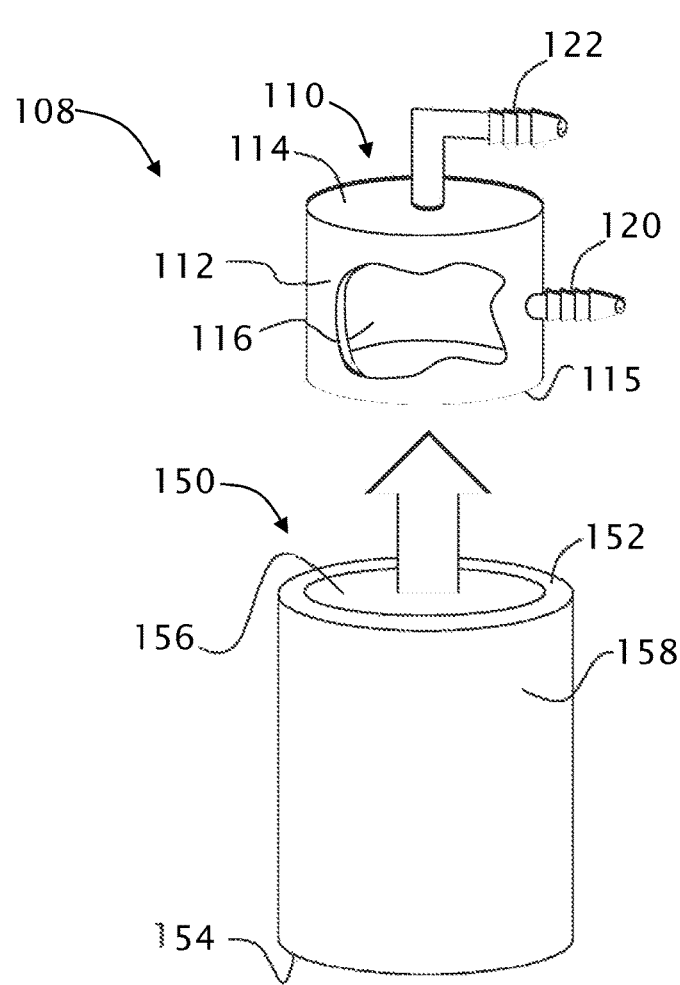

FIG. 4A is a close-up view of a single-stem sapling 20 that shows an example sap-collecting device 108. Sap-collecting device 108 includes an end cap 110 operably arranged over sapling end 24. FIG. 4B is similar to FIG. 4A and is a partial cut-away view of sap-collecting device 108 at end cap 110. FIG. 4C is an isometric view of an example sap-collecting device 108 showing end cap 110 along with a sealing member 150. Sealing member 150 is shown in the form of a flexible sleeve whose function is explained below.

End cap 110 has a cylindrical portion 112. A top 114 covers one end of cylindrical portion 112 and serves to define an interior 116 that is open at a bottom end 115 of the cylindrical portion. Cylindrical portion 112 is sized to fit over the outer surface 22 of stem 21 at top end 24 so that the top end 24 of the stem occupies a portion of interior 116 while being large enough to leave a region 116E of the interior adjacent top 114 unoccupied by the stem. Interior region 116E is initially filled with air 118, as shown in FIG. 4B.

End cap 110 includes on cylindrical portion 112 an access port 120 that connects to interior 116 and in particular to interior region 116E when the end cap is operably arranged on stem 21. In an example embodiment, access port 120 comprises a connector fitting adapted to operably engage with a proximal end 206 of a drop line 204, which in an example is part of the aforementioned line system 200. Drop line 204 also includes a distal 208 opposite the drop line proximal end 206 (see FIG. 2) and that connects the drop line to line system 200.

Drop line 204 is configured to allow for a partial vacuum to be formed in interior region 116E by serving as a conduit for removing air 118 via the action of a vacuum pump 302, as discussed below in connection with FIG. 5. The application of a vacuum to sap-collecting device 108 serves to draw sap 27 from the stem 21 at top end 24, as indicated by the large arrow in FIG. 4B. Note that in the example configuration shown in FIG. 4B, the angled top end 24 of stem 21 facilitates the flow of sap 27 within interior region 116E towards access port 120, which in an example is located towards bottom end 115 of cylindrical portion 112 of end cap 110.

End cap 110 can also include a second access port 122, which in the example shown in FIGS. 4A through 4C is on top 114 of the end cap. In an example embodiment, second access port 122 comprises a connector fitting adapted to operably engage with an end 142 of a vacuum line 140, which is used to augment vacuum beyond that provided by drop line 204 by removing air but not sap from interior region 116E. Second access port 122 is thus also referred to below as a vacuum-line access port. In an example, second access port 122 can be located on the side of the end cap somewhat above access port 120, as shown in FIG. 4D.

End cap 110 needs to secured to stem 21 at top end 24 in a manner that allows for interior region 116E of cap interior 116 to support a vacuum. Thus, in an example, end cap 110 is vacuum-tight sealed to sapling 20 using a separate sealing member 150. It is noted here that in another embodiment, sealing member 150 may be formed integral with or otherwise be pre-attached to cap 110. An example sealing member 150 comprises a flexible sleeve, as shown by way of example in FIG. 4C. The flexible sleeve sealing member (hereinafter, "sleeve") 150 has a top end 152, a bottom end 154 and an interior 156 that is open at both ends. Flexible sleeve also has an outer surface 158. An example material for flexible sleeve 150 includes rubber.

Figure 4E:
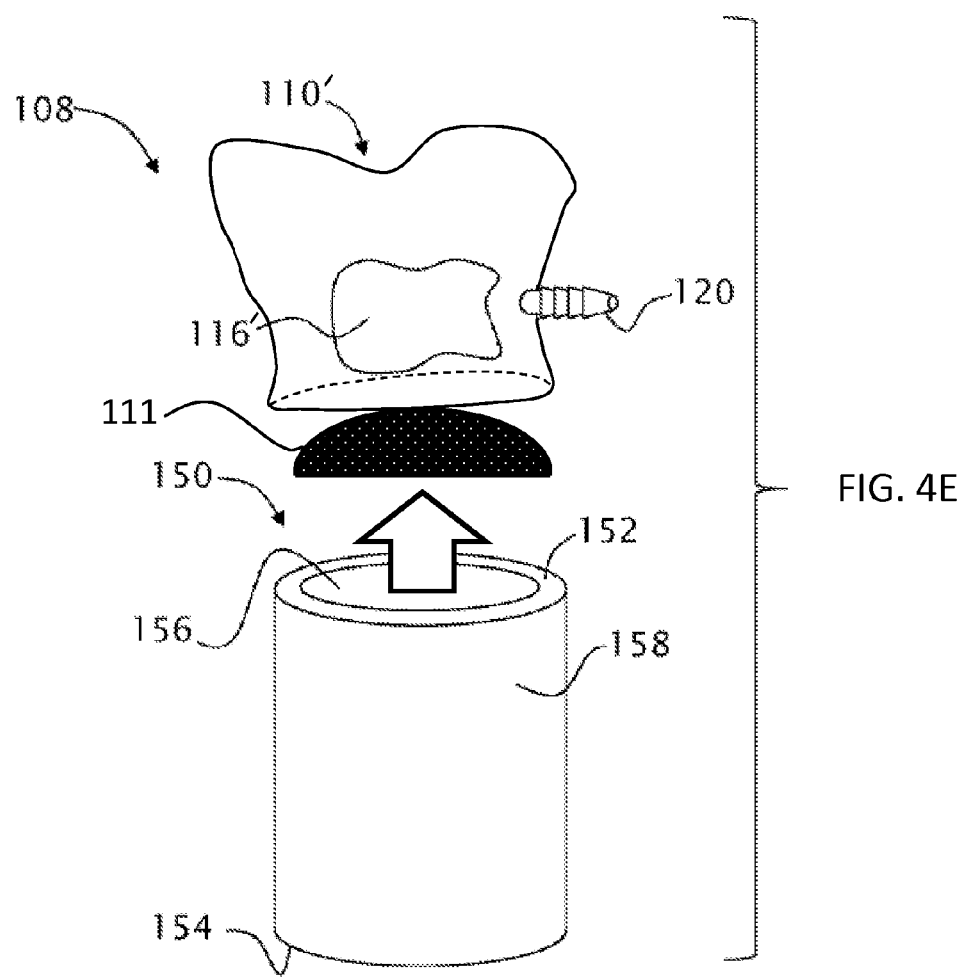

FIG. 4E shows another embodiment of an end cap 110' that is made of a flexible bag. Spacer 111 can be included to space the end cap 110' away from the outer surface 22 of stem 21. In this way, spacer 111 prohibits the flexible bag end cap 110' from collapsing against the outer surface 22, such that interior region 116' can be maintained for the partial vacuum. Spacer 111 can have any suitable shape, and may be a porous material or include apertures to ensure that the spacer 111 does not interfere with the partial vacuum. Similar to the embodiments discussed above, a flexible sleeve 150 can be used to produce a vacuum-tight seal to sapling 20. The flexible bag end cap 110' is advantageous in that a single-sized bag is adjustable and can be used with stems 21 having a wide range of diameters.

In an example of deploying sap-collecting device 108, prior to placing end cap 110 over top end 24 of stem 21, sleeve 150 is slid over the top end 24 of the stem 21 so that is surrounds the stem outer surface 22 at some distance below the stem top. End cap 110 is then placed over top end 24 of stem 21. At this point, sleeve 150 can be moved back up the stem 21 and so that the sleeve top end 152 stretches over and engages cylindrical portion 112 of end cap 110 at bottom end 115. Once sleeve 150 is in place, then one or more securing members 180 can be used to secure (e.g., squeeze) the sleeve and form a tight fit around stem 21 and cylindrical portion 112 of cap 110, thereby forming a vacuum-tight seal between the stem and the cap. This allows for a vacuum to be formed in interior region 116E of cap 110. An exemplary type of securing member 180 is a hose clamp.

Securing member 180 may also be used with the flexible bag end cap 110' in a similar manner as end cap 110. However, it is also possible to arrange the sleeve 150 such that it is not partially stretched over a bottom portion of the flexible bag end cap 110'. In other words, sleeve 150 can form a tight fit around stem 21, a portion of the flexible bag end cap 110' may be placed over the sleeve 150, and securing member 180 can secure the flexible bag end cap 110' against the sleeve 150 to form a vacuum-tight seal between the stem and the cap 110'.

It is worth noting that under gravity conditions, during the above-freezing sap flow period (exudation) in conventional sap-collecting systems and methods that employ a tap hole in a mature tree, almost all of the sap flows to the tap hole down from above under the action of gravity. Only a minor component of the sap flow is due to stem pressure from forces other than gravity. When a partial vacuum is applied to the tap hole, the same thing happens, but after a period of flow, the vacuum begins to propagate through the inner portion of the tree adjacent to the taphole, and pulls sap laterally across the stem, thus accessing a larger area of the wood/stem of the tree in which sap is stored. Under prolonged vacuum, sap can also be pulled upward (i.e., against gravity) to a limited extent.

Experiments conducted by the inventors directed to mapping sap flow in trees under different flow conditions revealed that during a prolonged period with no freezing temperatures (early stages of freezing causes water uptake which replenishes the sap in the tree), a significant amount of sap flow was obtained by applying a vacuum at the tap hole. This sap flow was attributed to pulling water directly up from the soil, through the stem (trunk) of the tree, and out of the tap hole.

This information lead to the realization that one could cut off the top portion of a sapling 20 to leave just stem 21 and then pull sap 27 from the top end 24 of the cut stem. Subsequent experiments confirmed that when extracting sap 27 under vacuum, there was sufficient time for water 9 taken up from the soil 8 to mix with the sugar 11 in the cut stem (see FIG. 2) and produce sweet sap that exuded from top end 24 of the stem (as shown in FIG. 4B).

Thus, using the systems and methods for sap collecting as disclosed herein, the top of the tree becomes unnecessary. Sapling 20 becomes essentially a sugar-filled straw through which water is pulled and sap extracted. A 1" Hg vacuum equals about 13" $H_2O$ vacuum. Thus, by pulling a 20" Hg vacuum, water and sap can be pulled upward by about 22 feet. This amount of vacuum is more than adequate to pull water 9 up from the soil (ground 8) through the stem 21 (where it mixes with sugar 11) and collect the resulting sap 27.

It is important to note that sapling does not die when utilized in the manner described herein. Single-stemmed saplings are able to regenerate new branches and foliage annually from stem or stump sprouts. In the case of multi-stemmed saplings, other stems remain intact, and new sprouts from cut stems can also generate branches and foliage.

Figure 5A:
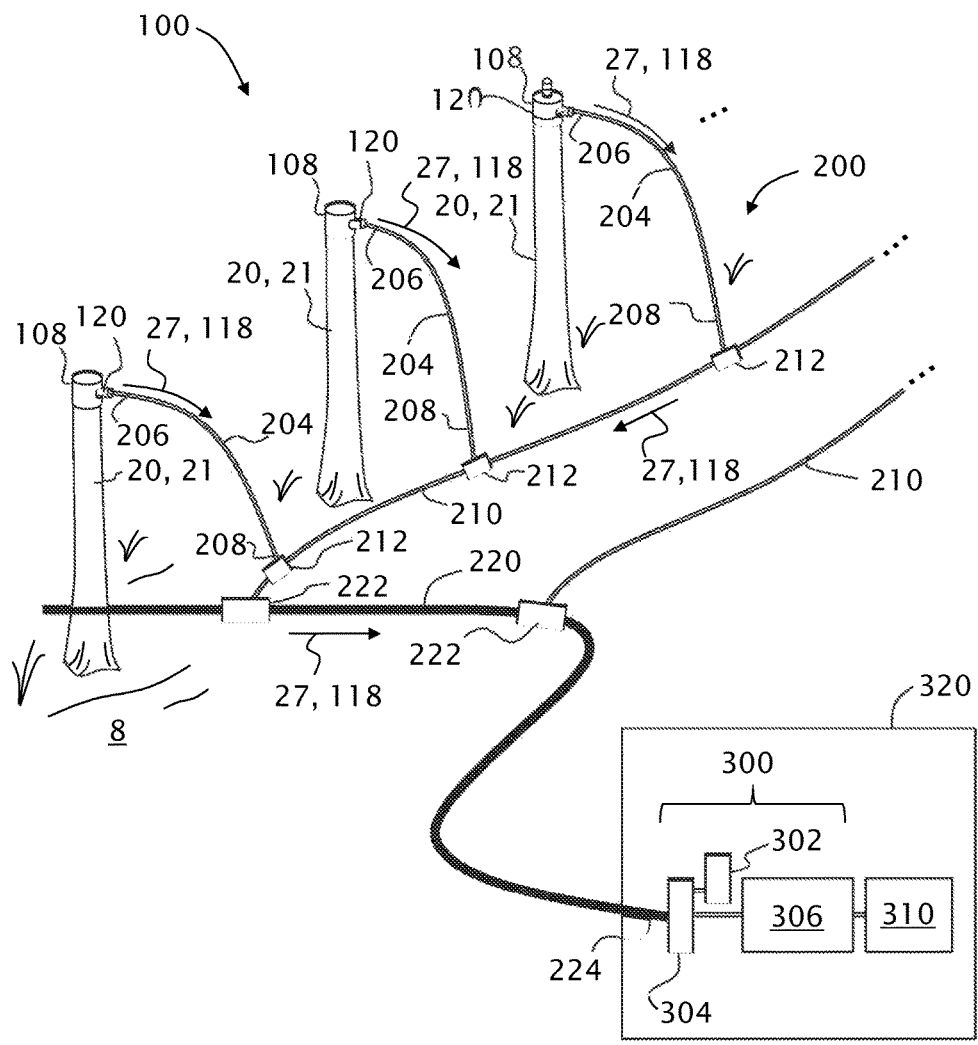
FIG. 5A and 5B are schematic diagrams of example plantation sap-collection systems.
Figure 5B:
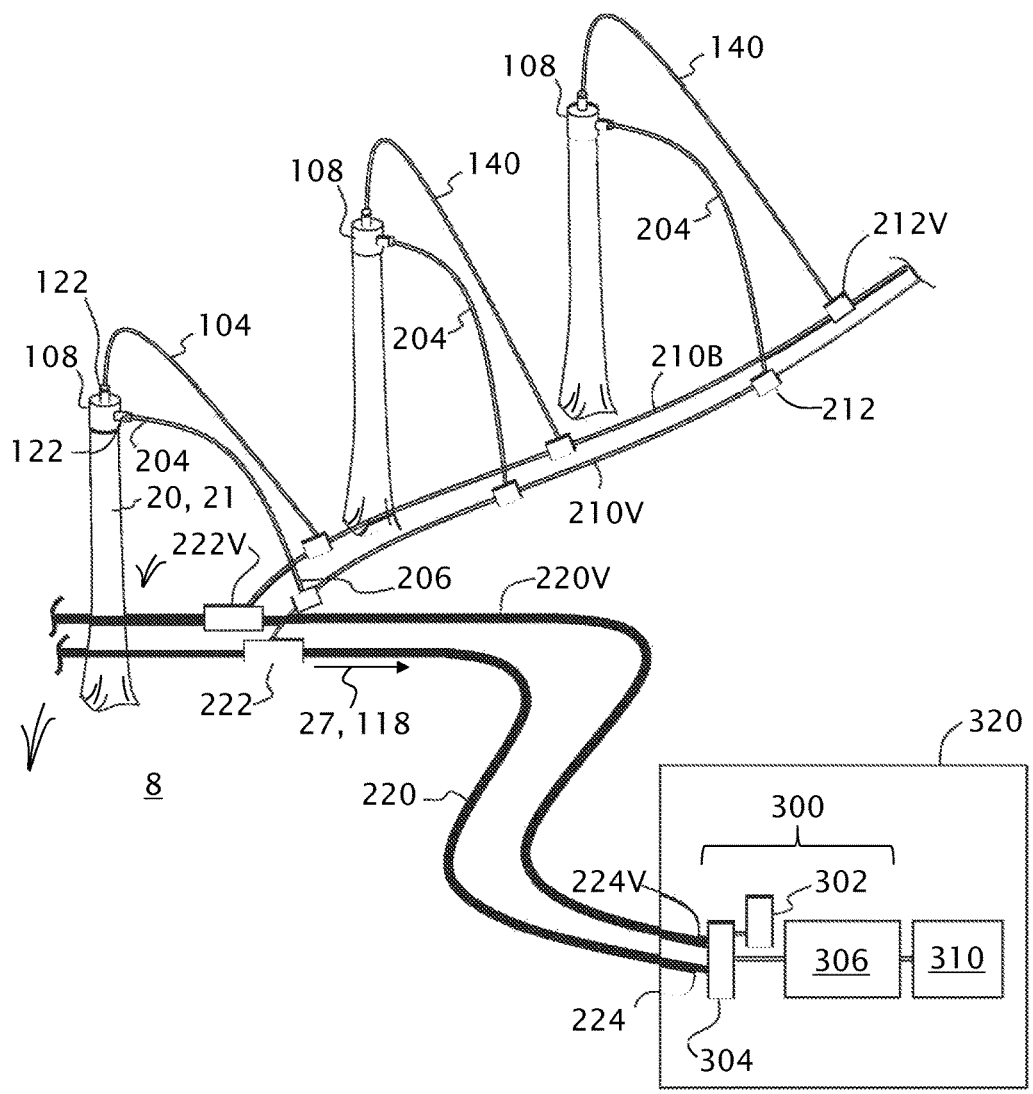

FIG. 5A and FIG. 5B are close-up views of a portion of example plantation sap-collecting systems 100 that includes a stand 10 of two or more saplings 20. As discussed above, stand 10 can have a high density of saplings 20, which can be in the range from about 5,000 to 10,000 saplings/acre and can cover multiple acres.

System 100 includes the aforementioned line system 200, which is configured to transport sap as well as support a vacuum in sap-collecting devices 108. In an example, line system 200 includes multiple drop lines 204, which as discussed above are operably connected at their respective proximal ends 206 to respective stems 21 via respective sap-collecting devices 108. Line system 200 also includes one or more lateral lines 210 that run between saplings 20, e.g., along sapling rows or between adjacent sapling rows. Line system 200 may also include a mainline 220 to which ends of the lateral lines are fluidly connected. In an example, drop lines 204 are fluidly connected at their respective distal ends 208 to lateral lines 210 via fittings 212, while the lateral lines are fluidly connected to mainlines 220 via fittings 222. In an example, mainline fittings 222 comprise saddle connectors. The various lines in drop line system 200 can comprise conventional tubing presently used in conventional maple syrup production systems.

System 100 also includes a vacuum system 300 to which an end 224 of mainline 220 is fluidly connected. An example vacuum system 300 includes a vacuum pump 302, an extractor 304 and a sap storage tank 306. An evaporator 310 is fluidly connected to vacuum system 300. Vacuum system 300, extractor 304, storage tank 306 and evaporator 310 are shown as housed in a sugarhouse 320. Thus, system 100 includes a sap-collecting system that comprises the sap-collecting devices 108, the line system 200 and the vacuum system 300.

Vacuum system 300 and line system 200 are configured to provide vacuum-assisted fluid communication between sap-collecting devices 108 on saplings 20 and vacuum system 300. The fluid connection between storage tank 306 and evaporator 310 allows sap 27 to flow from the saplings to the evaporator so that the sap can be processed into syrup. It is noted here that "fluid communication" refers to both the sap as a fluid, and the air in the line system as a "fluid." Said differently, line system 200 is sufficiently air-tight so that vacuum system 300 can pull a sufficient vacuum to facilitate the flow of sap from saplings 20 to the extractor 304, where the sap is then released into storage tank 300.

In an example, the amount of vacuum applied by vacuum system 300 is at least 10" Hg, with the maximum vacuum typically being limited only by the capacity of the vacuum system. In a specific example, the amount of vacuum is in the range from 20" to 28" of mercury. Sap then flows from the storage tank to the evaporator 310 where it is then processed into syrup.

Thus, in one example method of operation of system 100, in the spring of each year just prior to daytime temperatures reaching above freezing on a suitably regular basis, a stem 21 of sapling 20 is cut to form top end 24, and sap-collecting device 108 is operably arranged over the top end. Drop line 204 is operably connected to access port 120.

With reference to FIG. 5B, in another example embodiment, system 100 includes an optional secondary line system 200V fluidly connected to vacuum system 300. Secondary line system 200V includes the aforementioned vacuum line 140 operably connected to the aforementioned optional vacuum-line access port 122 on sap-collecting device 108. The secondary line system includes at least one secondary lateral line 210V to which vacuum lines 140 are operably connected via fittings 212V. Secondary line system 200V also includes a secondary mainline 220V suspended slightly above the (primary) lateral line 210 and (primary) mainline 220 and to which the at least one secondary lateral line 210V is operably connected via fittings 222V. Secondary mainline 220V includes an end 224V that is fluidly connected to vacuum system 300.

The main purpose of secondary line system 200V is to increase the amount of (partial) vacuum within end cap interior region 116E (see FIG. 4B) as compared to the amount of vacuum that is formed with the primary line system 200 alone. However, the combination of second line system 200V and vacuum system 300 can also serve as a backup conduit for sap transfer to extractor 304 if the primary vacuum system 201 and 220 were somehow rendered inoperable, such as being temporarily blocked ice formation.

In the operation of system 100, for each sapling 20, sap 27 exudes from stem top end 24 and passes through the corresponding cap 110 via access port 120. This sap 27 is then carried by drop line 204, lateral line 220 and main line 220 of line system 200 to collecting tank 306. Sap 27 in collecting tank 306 is eventually transferred to evaporator 310 to process the sap into syrup via evaporation.

The optional secondary line system 200V as shown in FIG. 5B might also be employed to clean line system 200 by allowing a sanitizing solution to be pulled in through line 140 into sap-collecting device 108 and removed through line system 200. In another example method of operation, system 100 is operated during select times of the year and other under conditions when sap or other desired plant compounds are available to be collected from saplings.

Although each individual sapling 20 will generally have a sap yield that is typically far smaller than a mature tree (e.g., about 25 times less), the vastly higher density of saplings in stand 10 allows for a higher sap yield on a per-area basis than is possible with a stand of mature trees. It is also pointed out that the systems and methods disclosed herein can be applied to collecting sap from not only maple saplings, but also from birch, black walnut, butternut and other types and species of saplings that generate a sap that might be worth collecting and processing.

Example Sap Collecting Study

In the spring of 2011, sap 27 was harvested from a stand 10 of maple tree saplings 20 in Underhill Center, Vermont. The saplings 20 had widths (diameters) W that ranged from 2 to 5 cm dbh. From the sugar yields obtained from these saplings over the course of a sap production season (which lasted about 8 weeks), the calculated production level from saplings of this size could equal between 500 and 900 gallons (syrup equivalent) per acre in a plantation system 190, which is roughly a 5× to 10× i.e., a 500% to 1,000% increase, in the production levels, as compared to conventional plantation systems.

Advantages

The systems and methods disclosed herein provide a number of advantages over conventional sap-collecting system and methods. First, the system and methods can be used to reduce many of the barriers to growth and productivity increases that are inherent in conventional sap collecting approaches, including both the finite availability of appropriate land, and the costs of acquiring such land. Because the same quantity of sugar produced annually using conventional sap-collecting systems and methods could be produced in a much smaller area using the system and methods disclosed herein, aspects of the disclosure include utilizing land that is otherwise deemed unsuitable for growing sap-producing trees and using it for growing a stand 10 of saplings 20. Such unsuitable land can be non-forested land already owned by a syrup producer, land with little or no slope, or acquired by a syrup producer for the express purpose of producing a stand of saplings.

The sap-collecting system and methods disclosed herein can also facilitate productivity increases by reducing operating costs. The much smaller crop and harvest area utilized in system 100 requires less tubing for line system 200 as well as less infrastructure to install, manage, and maintain. This in turn can substantially reduce the cost of supplies, labor, and time required to produce a given unit of syrup.

The sap-collecting systems and methods also allows for a greater degree of control over the genetic composition and phenotypic traits of crop trees, and allows for the planting of individual saplings that are predisposed to higher sap sugar contents. Likewise, the systems and methods offer greater control over the growing conditions of crop trees, enabling producers to facilitate growth and sugar production through common crop management practices such as irrigation, fertilization, and insect/disease pest management. In some examples, modification could include altering the temperature conditions around the plants by erecting walls or a roof over all or a portion of the plantation either during the growing season or during the harvest season.

Another advantage resides in the fact that small trees require smaller temperature fluctuations around the freezing point to induce sap flow. Consequently, the systems and methods disclosed herein are less susceptible to a reduction in freeze-thaw cycles (which drive sap exudation) that may arise as a result of climate change.

Another advantage is that it is easier to detect and control insects and pests in a plantation system than over a broad expanse of forested land and that smaller saplings are less susceptible to some pests (for example, the Asian Long-horned Beetle) than are mature trees.

Other advantages can include:
Sap yields per acre in the range of 5× to 10× current sap production yields available using conventional sap-collecting systems and methods;
Faster establishment of productive operation through the use of saplings;
Reduced land usage requirements;
The use of cut biomass for evaporator fuel or mulch in the plantation;
Reduced size of tubing systems and vacuum pumps; and
Reduced need for appropriately sloped terrain.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents

What is claimed is:

1. A sap-collecting system for collecting sap from a plurality of sap-producing saplings having respective stems each having a cut top end, comprising:
a plurality of sap-collecting devices operably disposed one each over respective top ends of the stems to form a vacuum-tight seal, each sap-collecting device having an interior and a first access port;
a line system operably connected to the first access ports;
a vacuum system operably connected to the line system, with the vacuum system including collecting tank, wherein the vacuum system is configured to apply a partial vacuum to each of the interiors of the sap-collecting devices so that sap flows from the top ends of the stems, through the corresponding sap-collecting devices and through the line system to the collecting tank; and
wherein the sap-collecting devices each include:
a flexible bag sized to fit over the top end of the corresponding stem;
at least one securing member configured to secure the flexible bag to the corresponding stem portion and to the end cap to form the vacuum-tight seal; and
a spacer configured to space the flexible bag away from the top end of the corresponding stem.

2. The system of claim 1, wherein the line system comprises:
drop lines operably respectively operably connected to the first access ports;
at least one lateral line operably connected to the drop lines; and
a main line operably connected to the at least one lateral line and to the vacuum system.

3. The system of claim 1, wherein the sap-collecting devices each include:
an end cap sized to fit over the top end of the corresponding stem;
a sealing member configured engage a portion of the corresponding stem and an end portion of the end cap; and
at least one securing member configured to secure the sealing member to the corresponding stem portion and to the end cap to form the vacuum-tight seal.

4. The system of claim 3, wherein the sealing member comprises a flexible sleeve.

5. The system of claim 3, wherein the end cap includes a second access port that is operably connected to the vacuum system via a vacuum line.

6. A plantation system for collecting sap, comprising:
a sap-collecting system of claim 1; and
a plurality sap-producing saplings to which the sap-collecting system is operably connected.

7. The plantation system of claim 6, wherein the line system comprises:
drop lines operably respectively operably connected to the first access ports;
at least one lateral line operably connected to the drop lines; and
a main line operably connected to the at least one lateral line and to the vacuum system.

8. The plantation system of claim 6, wherein the sap-collecting devices each include:
an end cap sized to fit over the top end of the corresponding stem;
a sealing member configured to engage a portion of the corresponding stem and an end portion of the end cap; and
at least one securing member configured to secure the sealing member to the corresponding stem portion and to the end cap to form the vacuum-tight seal.

9. The plantation system of claim 8, wherein the sealing member comprises a flexible sleeve.

10. The plantation system of claim 8, wherein the end cap includes a second access port that is operably connected to the vacuum system via a vacuum line.

11. The plantation system of claim 10, where the sap-producing saplings include one or more sapling from the group of sampling comprising: maple, birch, walnut, butternut, rubber, palm and grapevine.

\* \* \* \* \*